US009969032B2

(12) United States Patent
Colvin et al.

(10) Patent No.: US 9,969,032 B2
(45) Date of Patent: May 15, 2018

(54) BIMETALLIC WELDING ELECTRODE

(71) Applicant: The ESAB Group, Inc., Florence, SC (US)

(72) Inventors: Nathanael Micah Colvin, Spartanburg, SC (US); Valerio Cozzi, Varese (IT); James G. Schopp, York, PA (US)

(73) Assignee: THE ESAB GROUP, INC., Florence, SC (US)

( * ) Notice: Subject to any disclaimer, the term of this patent is extended or adjusted under 35 U.S.C. 154(b) by 592 days.

(21) Appl. No.: 14/034,661

(22) Filed: Sep. 24, 2013

(65) Prior Publication Data
US 2015/0001198 A1    Jan. 1, 2015

Related U.S. Application Data (60) Provisional application No. 61/705,222, filed on Sep. 25, 2012.

(51) Int. Cl.
*B23K 35/34* (2006.01)
*B23K 35/30* (2006.01)
(Continued)

(52) U.S. Cl.
CPC ........ *B23K 35/302* (2013.01); *B23K 35/0261* (2013.01); *B23K 35/3053* (2013.01); *B23K 35/406* (2013.01); *Y10T 29/4998* (2015.01); *Y10T 29/49982* (2015.01); *Y10T 29/49993* (2015.01)

(58) Field of Classification Search
CPC ............ B23K 35/0272; B23K 35/3086; B23K 35/365; B23K 35/0286; B23K 35/24

USPC ... 219/146.41, 146.32, 145.22, 146.1, 145.1, 219/146.23, 146.24, 146.3, 146.31, 219/146.51, 146.52
See application file for complete search history.

(56) References Cited

U.S. PATENT DOCUMENTS 2,464,186 A * 3/1949 Ross ........................ 219/145.32
3,114,033 A * 12/1963 Christian et al. ........ 219/146.41
(Continued)

FOREIGN PATENT DOCUMENTS

GB           1481140 A   *   7/1977
JP           08187589 A       12/1994

OTHER PUBLICATIONS

International Search Report and Written Opinion for PCT/US13/61545, dated Mar. 18, 2014.

*Primary Examiner* — Tu B Hoang
*Assistant Examiner* — Alba Rosario-Aponte
(74) *Attorney, Agent, or Firm* — Edell, Shapiro & Finnan, LLC (57) ABSTRACT

An electrode is disclosed for use in MIG/MAG welding. The electrode comprises an elongated electrode body within which is embedded a metallic filament. In some embodiments, the filament is copper, and is offset from the center of the electrode body. A method is disclosed for forming an electrode. The method may include removing oxidation from a surface of an electrode body, forming the electrode body to a desired size and geometry, removing lubricants from the surface of the electrode body, forming an elongated channel in a surface of the electrode body, depositing a filament in the elongated channel, and forming the electrode body over the filament. Other embodiments are disclosed and claimed.

7 Claims, 6 Drawing Sheets

(51) Int. Cl.
*B23K 35/02* (2006.01)
*B23K 35/40* (2006.01)

(56) References Cited

U.S. PATENT DOCUMENTS

| | | | |
|---|---|---|---|
| 3,452,419 A | | 7/1969 | Hillert |
| 3,559,864 A | | 2/1971 | Hillert |
| 3,778,587 A | | 12/1973 | Kubli et al. |
| 4,999,479 A | * | 3/1991 | Paton et al. ............. 219/145.22 |
| 5,857,141 A | * | 1/1999 | Keegan et al. ............... 428/560 |
| 2007/0267396 A1 | | 11/2007 | Oskarsson et al. |

\* cited by examiner

BIMETALLIC WELDING ELECTRODE

CROSS-REFERENCE TO RELATED APPLICATIONS

This is a non-provisional of pending U.S. Provisional Patent Application Ser. No. 61/705,222, filed Sep. 25, 2012, the entirety of which provisional application is incorporated by reference herein.

FIELD OF THE DISCLOSURE

The disclosure relates generally to the field of consumable welding electrodes and more particularly an improved bimetallic welding electrode and method of making the same.

BACKGROUND OF THE DISCLOSURE

In the art of gas metal arc welding it is common practice to use a process in which a metal wire, often referred to as a consumable electrode, is advanced through a welding gun while electrical energy is transmitted to the electrode by an electrified contact tip of the welding gun. Exemplary techniques for gas metal arc welding include MIG (Metal Inert Gas) and MAG (Metal Active Gas), with the difference between the two primarily being the type of shielding gas used. Typical inert gases are argon and helium. Typical active gases are mixtures of argon, carbon dioxide and oxygen.

In MIG/MAG-welding, the workpiece is heated primarily by an arc. The electrode is heated, partly by the power supplied when the weld current flows through the electrode and partly by the arc itself. MIG/MAG-welding takes place in one of three states. In short arc welding, the material transport from the electrode to the workpiece takes place through large short-circuiting droplets. When the supplied power is increased, the process passes into the mixed arc area, where the material transport takes place through a mixture of short-circuiting and non-short-circuiting droplets. The result is an unstable arc with significant weld spatter and weld smoke. Welding in this area is normally avoided. At a sufficiently high supplied power, the process enters the spray area, where material transport takes place through small finely dispersed droplets without short circuits. The third state is referred to as pulsed welding and means that, by means of advanced control, proper cut off of the droplets can be controlled by means of a suitable current pulse. Each pulse cuts off a droplet and the droplets become sufficiently small so as not to short-circuit. This method results in advantages from the spray area in the form of low weld spatter without the disadvantages of large heat transfer.

MIG/MAG welding electrodes are generally offered in two basic varieties: bare and coated. Both varieties can be alloyed with additional materials and provided with surface additives for enhancing performance characteristics, such as arc stability and feeding resistance. Bare electrodes, sometimes referred to as solid or uncovered electrodes, typically consist of a bare, base metal wire, such as may be formed primarily of steel, aluminum or stainless steel, that is drawn down to a desired diameter. Bare electrodes generally provide good arc start and stability between an electrode and a workpiece, as well as low feeding resistance and minimal spatter when melted. However, a problem commonly associated with bare electrodes is poor current transfer between an electrode and the contact tip of a welding gun. Current transfer instability can result in significant wear on the contact tip over a relatively short period of time, thus requiring frequent replacement of the tip. Such replacement is both inconvenient and costly.

Coated electrodes, sometimes referred to as covered electrodes, are substantially similar to bare electrodes but are provided with an exterior coating of copper, such as may be applied through conventional electroplating and electroless plating processes. The copper coating provides superior current transfer stability between the electrode and the tip of the welding gun relative to bare electrodes, thus resulting in less tip wear and less frequent tip replacement. However, coated electrodes are more costly, have greater feeding resistance, produce more spatter, and exhibit inferior arc start and arc stability between the electrode and a workpiece relative to bare electrodes. Moreover, the electroplating or electroless plating processes required for producing coated electrodes require specialized facilities and involve the use and disposal of caustic and acidic chemical agents that are harmful to the environment.

SUMMARY

In view of the forgoing, it a consumable MIG/MAG welding electrode is disclosed that facilitates good arc start and stability between the electrode and a workpiece as well as good arc stability between the electrode and a contact tip of a welding gun. The disclosed MIG/MAG electrode also exhibits low feeding resistance and produces minimal spatter when melted. A convenient method is also disclosed for producing such an electrode that does not require highly specialized facilities or equipment and that does not involve the use, or require the disposal of, harmful chemical agents.

The disclosed electrode is a hybrid electrode that will fuses the production, environmental and welding benefits of bare wire with the superior tip wear of copper-coated wire. The disclosed electrode may include a current conducting filament. In one exemplary embodiment, the current conducting filament may be comprised of elemental copper. The current conducting filament may also be made from one or more of the following: metallic elements, compounds, plasmas, conductive polymers, salts and salt solutions composed of one or more of the following: alkali element metals, alkali element earth metals, transition element metals, and non-element metals and graphite. A filament containing one or more of these materials may be embedded into the surface of the MIG wire, running parallel to the wire axis. The effect of the filament present on the consumable MIG electrode is to serve as a sacrificial material to stabilize the current interface erosion process between the welding tip and the electrode.

The disclosed design may also include alloying elements below the current conducting filament. The addition of the contained arc enhancing element to the electrode body facilitates the use of very reactive arc enhancers in the welding electrode due to the removal of atmospheric interaction with the material sealed below the surface filament. The addition of the alloying element in or below the arc conducting filament will allow for the manufacture to transform the filer metal from its base rod alloy to a new alloy in its as finish welded state.

Benefits of the disclosed electrode and process of making the disclosed electrode include elimination of the use of environmentally harmful acid, caustic, and copper sulfate solutions used in the copper plating process, reduction of contaminated waste water generated during the copper plating process. In addition, greater control of the copper filament lay process is achieved by incorporating the filament at a rate of about 1-3 meters/second, as opposed to plating which is normally achieved at rates of 24-25 meters/second.

In addition, the disclosed process facilitates the standardization of rod alloys to one base alloy, thus reducing the number of different types of rod alloys required to be stocked. All finish alloying can be achieved through the introduction of the metallic filament into the parent alloy of the stock rod.

In an exemplary embodiment, a rod element according to normal product specification (e.g., S2, S3, S6) is provided. Surface oxides are removed via one or more chemical or mechanical processes. The rod element may be rolled/drawn using a reduction die to ensure the wire has a concentric geometry. The surface of the rolled/drawn wire may then be prepared, such as by the removal of any remaining forming lubricants. The rod may then be roll formed to create a longitudinal recess in the surface of the rod to allow for the addition of a copper filament. A copper filament may then be provided in the recess so that the longitudinal axis of the filament aligns with the longitudinal recess. The filament may then be compressed within the recess by die or roll forming such that the filament is enclosed within the rod. The percentage of filament material, expressed as a function of the total weight of the resulting electrode, may be less than the AWS specification for maximum copper content. The rod may then be drawn/rolled to obtain a desired finish diameter.

In some embodiments, are enhancing agents/compounds are introduced into the recess before the filament is provided in the recess. If arc enhancers are disposed in the recess before the filament, they will be enclosed within the rod during the subsequent die or roll forming operation.

Further options for this portion of the process include not only introducing the filament to the rod material, but also to apply the principles of the invention to flux cored wire technology. In such applications, a filament-embedded strip material may be engineered that includes arc enhancers sealed in the core. This option would maximize the retention of arc enhancing material from below the filament in the mechanical fusion portion of the process.

In additional embodiments, alloying elements may be introduced into the recess formed in the rod. These alloying elements may be introduced into the void and encapsulated with either a copper strip or simply enveloped by the base material by subsequent die or roll forming. The disclosed methods and arrangements may facilitate the use of relative low generic grades of steel, and custom alloying them in the factory to the specifications of the customer.

In accordance with the present disclosure, a method for adding an element or compound to the composition of a stock welding electrode is provided. An embodiment of the method may include the steps of removing oxidation from a surface of the stock electrode, conforming the stock electrode to a desired size and geometry, removing lubricants from the surface of the stock electrode, and forming an elongated channel in the surface of the stock electrode. The method may further include depositing a filament formed of an additional element in the elongated channel, compressing the stock electrode and the filament together, and reducing a diameter the compressed stock electrode and filament to a desired size.

A bimetallic welding wire is disclosed. The welding wire may comprise a wire having a longitudinal axis, the wire having an elongated channel formed on a surface thereof. The elongated channel may be aligned with a longitudinal axis of the elongated member. The welding wire may include a first material disposed in the elongated channel. The elongated channel may be offset from a center of the welding wire.

A method of making a welding wire is disclosed. The method may include forming an elongated channel in a welding wire, the welding wire having a longitudinal axis, the elongated channel being offset from the longitudinal axis; depositing a first material in the elongated channel; and deforming the welding wire to fix the first material to the welding wire.

BRIEF DESCRIPTION OF THE DRAWINGS

By way of example, specific embodiments of the disclosed device will now be described, with reference to the accompanying drawings, in which.

DETAILED DESCRIPTION

Figure 1:
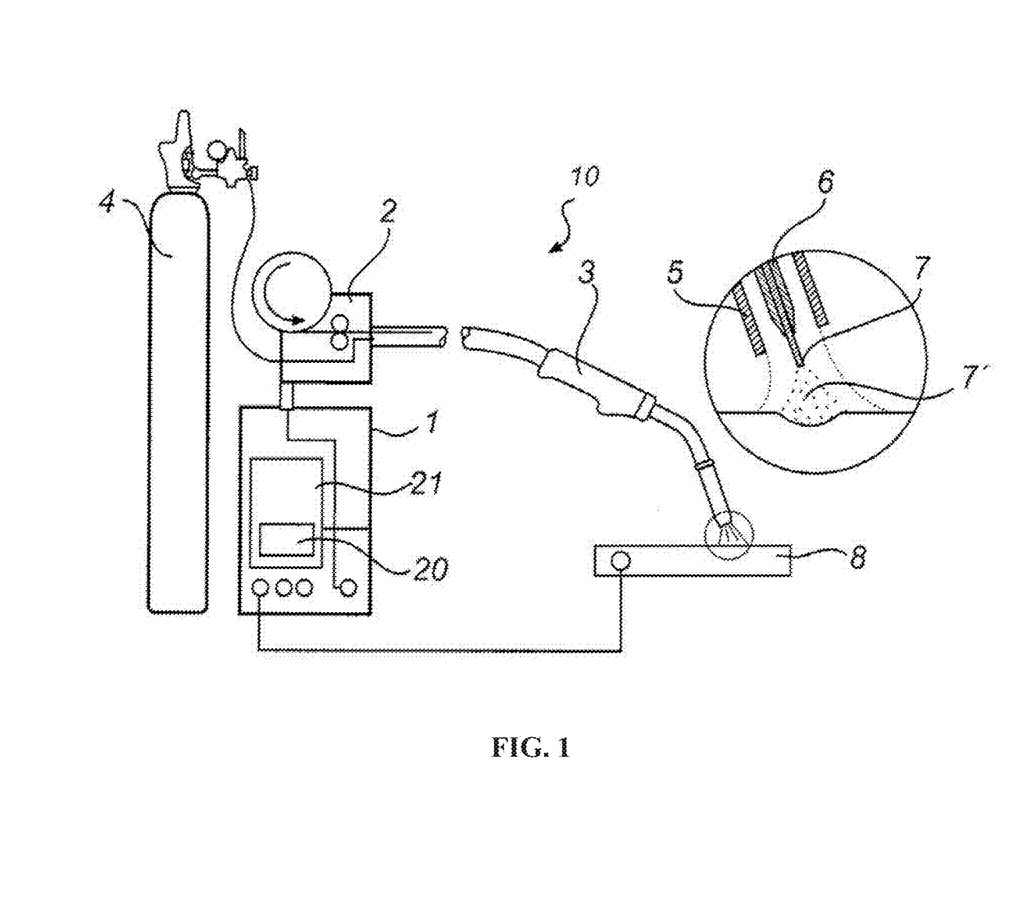
FIG. 1 is a schematic diagram of an exemplary device for MIG/MAG-welding.

FIG. 1 illustrates an exemplary arrangement of welding equipment used for MIG/MAG welding. A welding machine 10 includes a power source 1 adapted to supply welding energy, or melting power, to an electrode 7. In some cases, the power source 1 comprises an inverter power supply. An electrode feeder 2 is provided on the welding machine 10, and operates to feed the electrode 7 to a welding torch 3. The welding torch 3 is connected to the electrode feeder 2, the welding machine 10 and a gas container 4 via a welding cable. The welding torch 3 comprises a gas cup 5 and a contact tube 6 through which the electrode 7 is fed to a position in the proximity of the workpiece 8. Welding gas is supplied from the gas container 4 to the space enclosed between the gas cup 5 and the contact tube 6. The welding equipment may also comprise a welding controller 20. The welding controller 20 includes a general controller 21 which is arranged to control the welding current and voltage by setting appropriate static and dynamic characteristics for a work piece to be welded. The general controller 21 can also be configured to regulate the feeding velocity of the electrode feeder 2. The general controller 21 specifically sets a reference voltage which is used as a reference for an average voltage during the welding process.

Referring to FIGS. 2 and 3A-3E, an exemplary process is illustrated for making electrodes for use with the welding machine 1 of FIG. 1. It will be appreciated that the disclosed electrodes are not limited to use with the welding machine of FIG. 1, but instead can be used with any of a variety of appropriate welding equipment.

Figure 2:
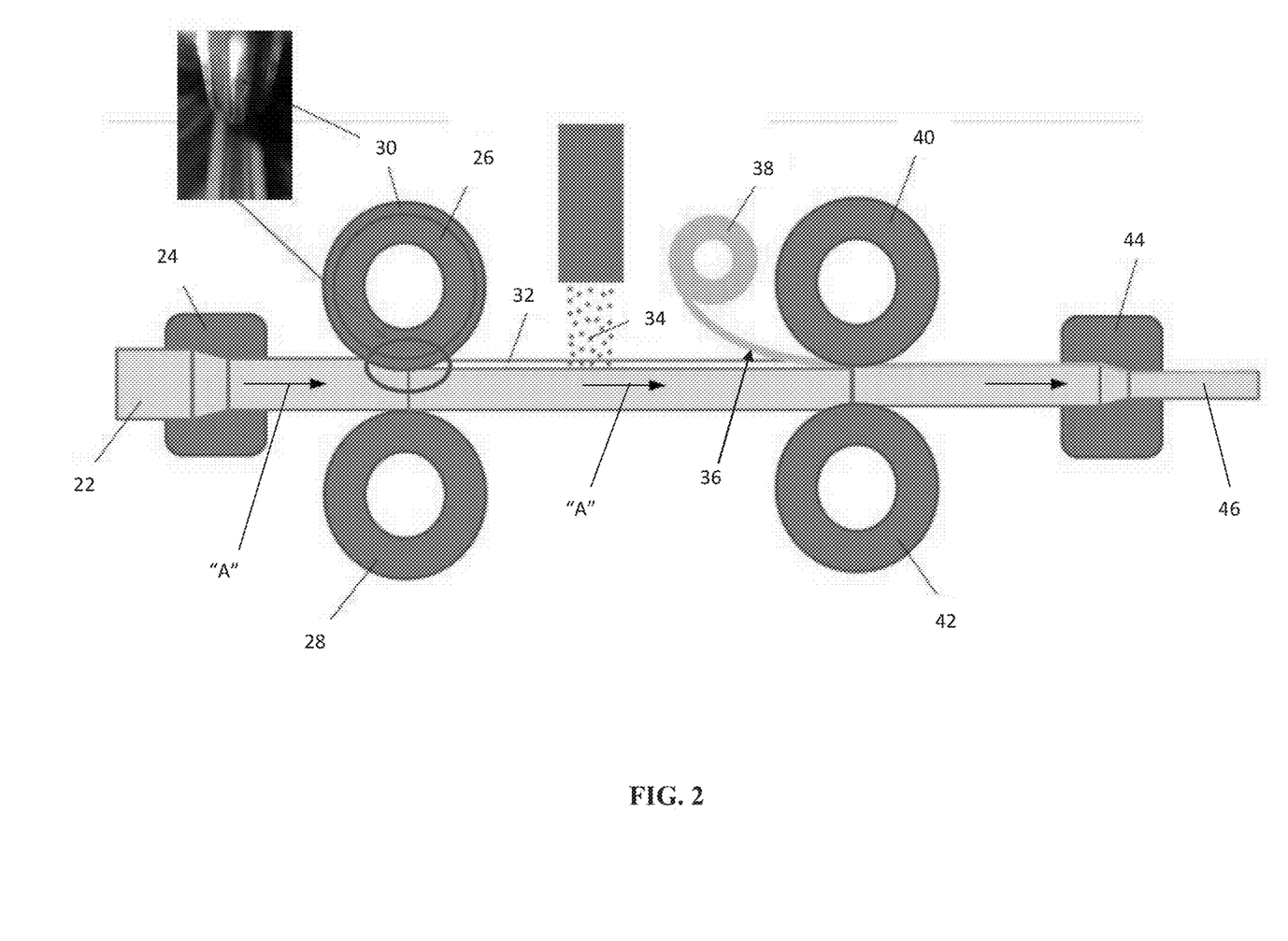
FIG. 2 is a schematic diagram illustrating an exemplary arrangement for making an electrode in accordance with the disclosure.

FIG. 2 shows an exemplary process for converting a length of stock welding wire 22 into a bimetallic welding electrode having enhanced performance characteristics in accordance with the present disclosure. The stock wire 22 may be any variety of conventional materials used for MIG/MAG welding, such as steel, aluminum, stainless steel, or various composite materials, and may conform to any desired electrode specification (e.g., S2, S3, S6, etc.). As will be appreciated by those of ordinary skill in the art, the stock wire may be alloyed with additional metals to improve certain attributes of the resulting, such as arc stability, feeding resistance, and susceptibility to surface oxidation.

Figure 3A:
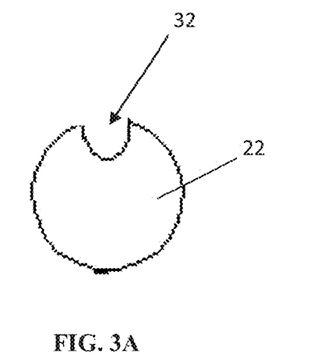
FIGS. 3A-3E are cross-section views of the electrode at various points in the manufacturing process.
Figure 3B:
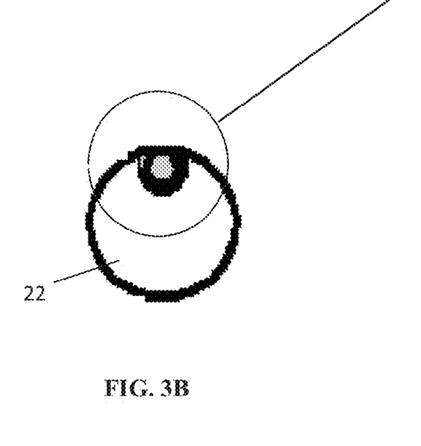
Figure 3C:
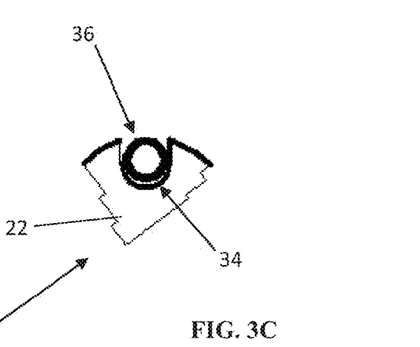

Referring to FIGS. 2 and 3A-3E, a first embodiment of the disclosed technique for manufacturing a MIG/MAG electrode will be described. A stock wire 22 may be introduced into a reduction or shaping die 24 along the direction of arrow "A." The reduction or shaping die 24 may be configured to provide the wire with a consistent, circular cross section. The wire 22 is then introduced between first and second rollers 26, 28, at least one of which is provided with a surface feature 30 configured to impart a longitudinally-extending channel 32 to the surface of the wire 22. In the illustrated embodiment, the pair of rollers 26, 28 are disposed in an opposing, laterally-spaced relationship, and the first rollers 26 includes a circumferential projection 30 extending radially therefrom so that as the wire 22 is fed through the rollers 26, 28, the projection 30 is forcibly pressed into the surface of the wire 22, thus forming the longitudinally-extending channel 32. The channel 32 is shown in FIG. 3A as having a substantially rounded, U-shaped cross-section. It will be appreciated, however, that the channel 32 may be provided in any of a variety of different cross sectional shapes, such as rectangular, V-shaped or the like. In addition, the dimensions of the channel 32 may be selected to accommodate the particular size and shape of the material being deposited therein, and to ensure that at least a portion of the filament is exposed to the surface of the resulting electrode. The shape and size of the channel 32 may be controlled through selection of the projection 30 used to form the channel 32.

In some embodiments, one or more arc enhancing materials 34 may be deposited in the channel 32. The arc enhancing materials may provide the finished electrode with desired arc start and stability characteristics. Examples of arc enhancing materials 34 include lithium, sodium, potassium, cesium rubidium, tungsten, carbon and the like including their forms in either a salt, compound molecule or elemental form. Such materials 34 may be applied to an interior surface of the channel 32. Nominal % of these material can range from 1 g per kilogram to 100 g per kilogram depending on the element and the welding application. If arc enhancing materials 34 are used, the channel 32 may be sized accordingly.

A current conducting filament 36 may be disposed in the channel 32 so that it lays on top of the arc enhancing material 34 (where such materials are used). The arrangement of the wire 22, arc enhancing materials 34 and filament 36 is shown in cross-section in FIGS. 3B and 3C. The filament 36 may be drawn from a spool 38 in a continuous fashion and laid into the channel 32 as the wire 22 is moved in the direction of arrow "A." In some embodiments, the filament 36 may comprise copper so as to provide the resulting "bare" electrode with all of beneficial characteristics of copper coated electrodes. The filament 36 may have a diameter that results in a desired weight percent of copper in relation to the base metal in the wire 22, such as may be required by the particular application. In one non-limiting exemplary embodiment, the filament is sized so that the resulting electrode includes 0.12% copper, which may correspond to a filament having a diameter of 0.012—inches. In other embodiments, the filament 36 may be sized so that resulting electrode includes 0.5% copper, such that a correspondingly larger filament may be used. The channel 32 may be sized appropriately to fit within the filament 36 in a closely conforming relationship therewith. Although the filament 36 is shown as being circular in cross-section, it will be appreciated that it can instead be provided in other shapes, such as flat (strip), rectangular, triangular, and the like.

Figure 3D:
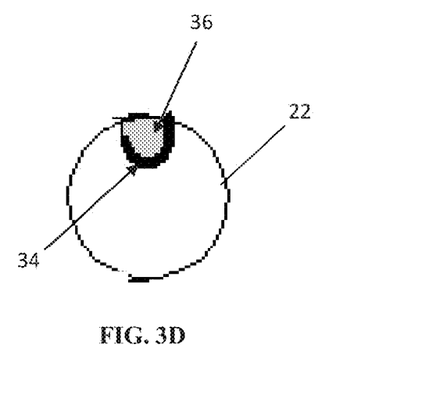

The wire 22, with the filament 36 and optionally the arc enhancing materials 34, may then be passed through a pair of rollers 40, 42 disposed in an opposing, laterally-spaced relationship. The rollers 26 and 28 may compress the wire, forcing the walls of the channel 32 inward, and forming the wire material over the filament so as to partially or completely enclose the filament 36 within the wire 22. The cross-section at this stage is shown in FIG. 3D. If arc enhancing materials 22 are used, they will be sealed within the wire 22 along with the filament. Nominally the base material will interface with the filament to join the filament to the base material. The filament may be joined to the base material via various methods to ensure it is held in place in the base material.

Figure 3E:
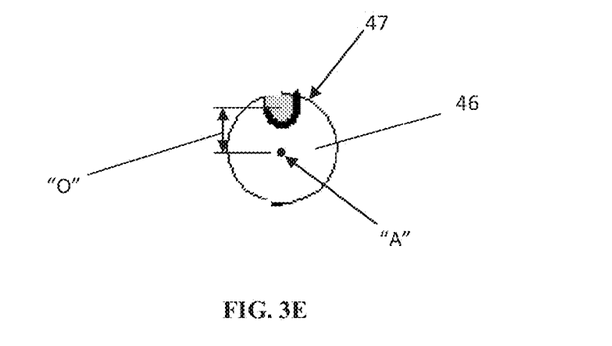

Preferably, the filament material will be placed into the base material in a manner that ensures that a portion of the filament is exposed to the surface. The wire 22, including the filament 36 and the arc enhancing materials (if used) may then be introduced into a reduction die 44 to reduce the diameter of the wire 22 to a desired final size and outer contour is provided. The cross-section at this stage is shown in FIG. 3E. The finished electrode 46 may be cut to a desired length and packaged, or may be passed along for further processing.

As can be seen, the filament 36 (along with any arc enhancing materials) are offset from the longitudinal axis "A" of the finished electrode 46 by an offset distance "O," so that the filament lies directly adjacent to the electrode's outer surface 47 and a portion of the filament is exposed to the outer surface 47. The copper present on the electrode 46 wire will effectively serve as a sacrificial material to stabilize the arc erosion process between the tip and the electrode.

As previously noted, applying a copper or other current transferring filament to the wire 22 in the manner described above provides several advantages relative to conventional copper plating techniques. The above-described process does not require specialized electroplating equipment or facilities and may therefore be performed on-site and on an as-needed basis by a retailer or other non-manufacturer party. Moreover, the process of the present disclosure does not require the use of acids, caustic agents, or copper sulfate ($CuSO_4$), and does not produce contaminated waste water or fumes that can be harmful to the environment.

Figure 4:
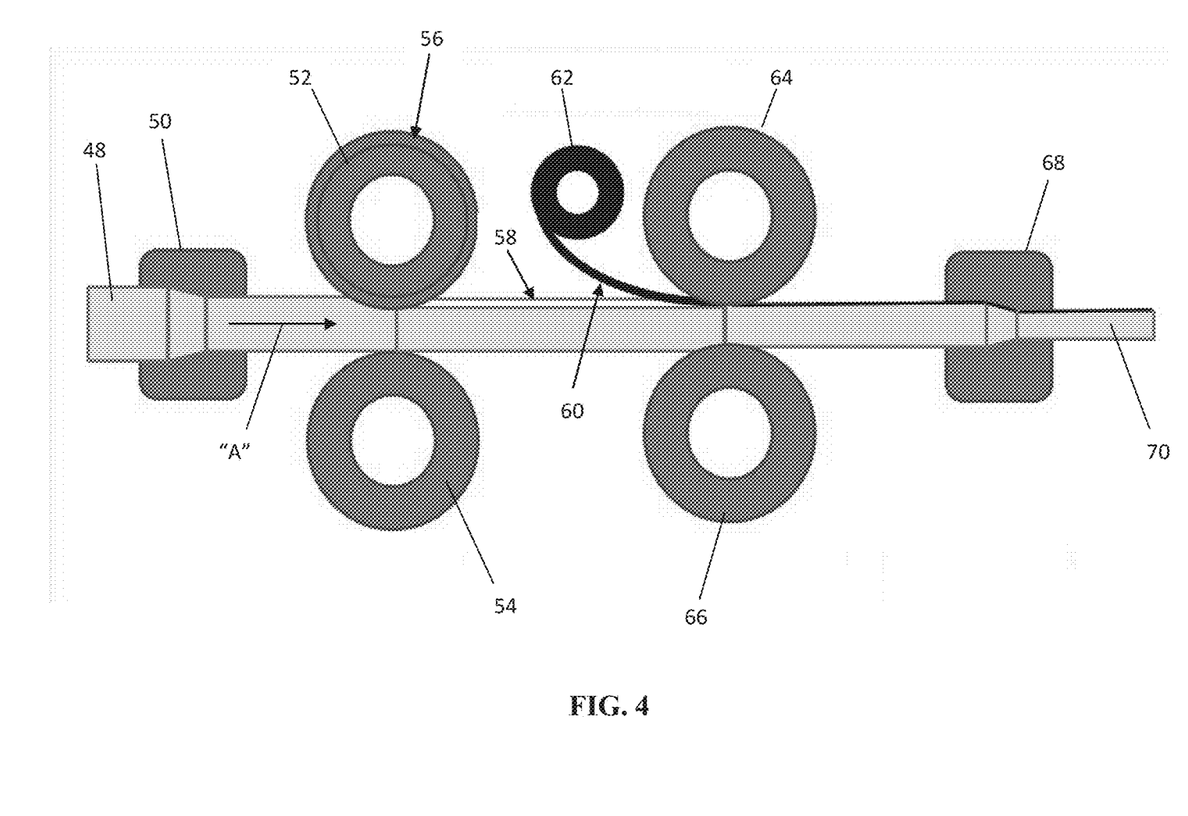
FIG. 4 is a schematic diagram illustrating an alternative exemplary arrangement for making an electrode in accordance with the disclosure.

Referring now to FIG. 4, an embodiment will be described in which alloying materials may be introduced into a wire in a manner similar to that described in relation to FIG. 2. As will be appreciated, by providing alloying materials within a channel in a generic wire, cost savings can be achieved by eliminating the need to stock a large number of different wires having different alloy compositions. Rather, a large volume of a relative small number of different wire base materials can be stocked, and when an order is received, a desired alloy formulation may be added to the base material in an efficient and tightly controllable manner. In one embodiment the base material of the stock wire 48 is steel. It will be appreciated, however, that the invention is not so limited, and other base materials can also be used, as desired. The disclosed technique may facilitate the manufacture of most desired alloyed grades starting from the same non-alloyed base wire material.

The stock wire 48 may be introduced into a reduction or shaping die 50 along the direction of arrow "A." The reduction or shaping die 50 may be configured to provide the wire with a consistent, circular cross section. The wire 48 is then introduced between first and second rollers 52, 54, at least one of which is provided with a surface feature 56 configured to impart a longitudinally-extending channel 58 to the surface of the wire 48. In one embodiment, the surface feature 56 is a circumferential projection extending radially therefrom so that as the wire 48 is fed through the rollers 52, 54, the projection is forcibly pressed into the surface of the wire 48, thus forming the longitudinally-extending channel 58. The channel 58 may have some or all of the characteristics described in relation to the channel 32 of FIGS. 2-3E.

In some embodiments, one or more alloying materials 60 may be disposed in the channel 58. These alloying materials 60 may be formulated so that a finished weld will have a desired material composition. Examples of appropriate alloying materials include Aluminum, Arsenic, Boron, Carbon, Calcium, Chromium, Copper, Hydrogen, Mangenese, Molybdenum, Nitrogen, neodymium, Nickle, Oxygen, Antimony, Silicon, Tin, Titanium, Tungsten, Zirconium and the like in elemental, salt or compound format. In the illustrated embodiment, the alloying material 60 is provided in the form of a strip which is laid into the channel 58. Although not shown, in some embodiments, are enhancing materials, similar to those described in relation to FIGS. 2-3E may be disposed in the channel 58 so that the alloying material 60 is laid on top thereof. The alloying material 60 may be drawn from a spool 62 in a continuous fashion and laid into the channel 58 as the wire 48 is moved in the direction of arrow "A." When provided in strip form, the alloying material 60 may have a diameter that results in a desired material composition of the resulting weld. The channel 58 may be sized appropriately to fit around the alloying material 60 in a closely conforming relationship therewith. The alloying material 60, when provided in strip form, may have a cross-section that is circular, flat (strip), rectangular, triangular, and the like.

The wire 48, with the alloying material 60 and optionally the arc enhancing materials, may then be passed through a pair of rollers 64, 66 disposed in an opposing, laterally-spaced relationship. The rollers 64, 66 may compress the wire 48, forcing the walls of the channel 58 inward, and forming the wire material over the alloying material so as to partially or completely enclose the alloying material within the wire 48. If arc enhancing materials are used, they will be sealed within the wire 48 along with the alloying material.

The wire 48, including the alloying material 60 and the arc enhancing materials (if used) may then be introduced into a reduction die 68 to reduce the diameter of the wire 48 to a desired final size and outer contour is provided. The finished electrode 70 may be cut to a desired length and packaged, or may be passed along for further processing.

As with the previously described embodiment, the additives (the alloying material and any arc enhancing materials) are offset from the longitudinal axis of the wire, at or beneath the wire's surface. During welding, the alloying materials will combined with the base wire material to result in a weld having desired alloy properties.

It will be appreciated that the alloying material can also be used in combination with a metal filament. In addition, in some embodiments, a metal filament may be used in combination with arc enhancing materials and alloying materials.

Figure 5:
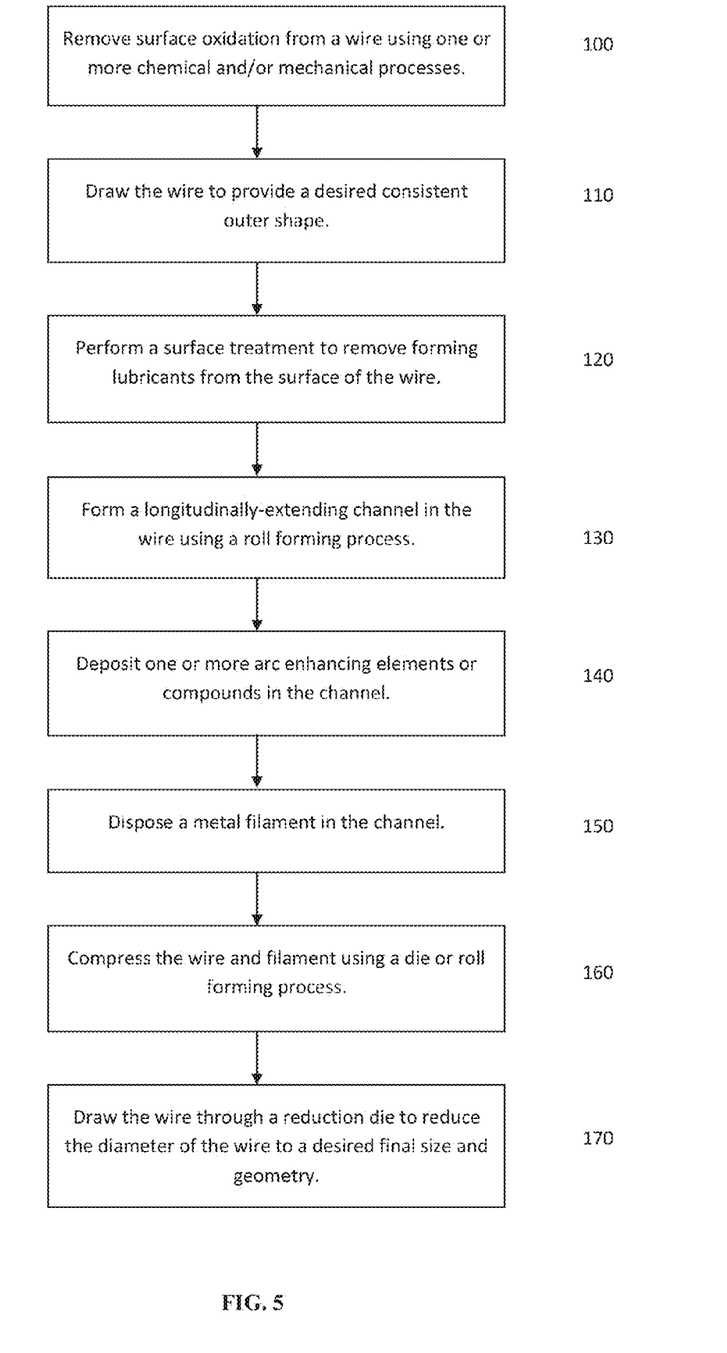
FIG. 5 is a flow chart illustrating an exemplary method of making an electrode in accordance with the disclosure.

Referring now to FIG. 5, an exemplary method of making an electrode will be described. At step 100, surface oxidation may be removed from a stock wire using one or more chemical and/or mechanical processes. At step 110, the wire may be drawn down slightly to provide a desired consistent outer shape. At step 120, a surface treatment may be performed to remove forming lubricants from the surface of the wire. At step 130, a longitudinally-extending channel may be formed in the wire using a roll forming process. In one embodiment, the wire is fed between a pair of rollers disposed in an opposing, laterally-spaced apart relationship. One the rollers may include a circumferential projection so that as the wire is fed between the rollers the projection is forcibly pressed into the surface of the wire, thus forming the channel therein. At optional step 140, one or more arc enhancing elements or compounds may be deposited in the channel. At step 150, a metal filament is disposed in the channel. The filament may be formed of copper, for example, for providing the electrode with beneficial characteristics that have heretofore been realized by providing electrodes with a copper coating using conventional copper plating processes. At step 160, the wire and filament may be mechanically compressed by a die or roll forming process. In one embodiment, the wire (with the embedded filament) may be fed between a pair of pinch rollers so that the filament is forcibly pressed into the channel and the walls of the channel are forced inward to partially or completely enclose the filament. At step 170, the wire, including the filament and any additional optional arc enhancing materials, may be drawn through a reduction die to reduce the diameter of the wire to a desired final size and to ensure concentric geometry. The resulting finished electrode may be cut to a desired length and packaged, or may be passed along for further processing.

Figure 6:
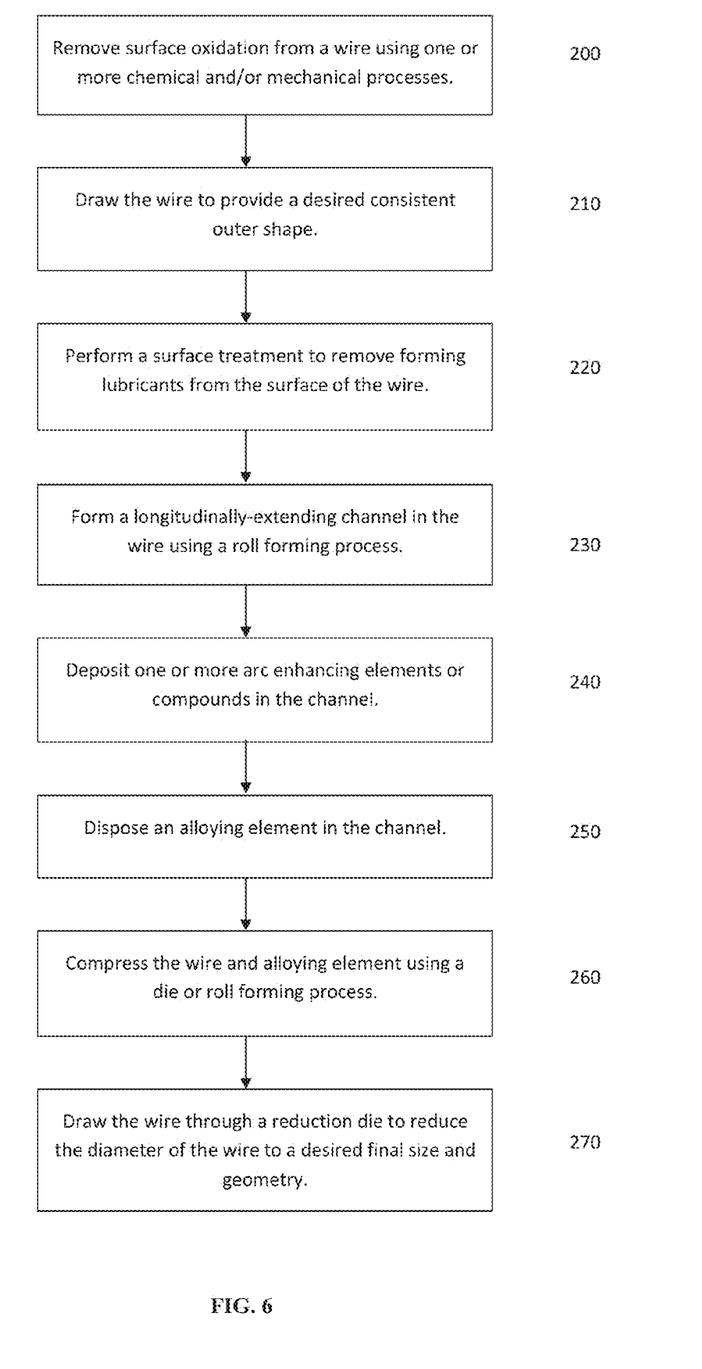
FIG. 6 is a flow chart illustrating an exemplary alternative method of making an electrode in accordance with the disclosure.

FIG. 6 shows an exemplary alternative method according to the disclosure. At step 200, surface oxidation may be removed from a stock wire using one or more chemical and/or mechanical processes. At step 210, the wire may be drawn down slightly to provide a desired consistent outer shape. At step 220, a surface treatment may be performed to remove forming lubricants from the surface of the wire. At step 230, a longitudinally-extending channel may be formed in the wire using a roll forming process. In one embodiment, the wire is fed between a pair of rollers disposed in an opposing, laterally-spaced apart relationship. One the rollers may include a circumferential projection so that as the wire is fed between the rollers the projection is forcibly pressed into the surface of the wire, thus forming the channel therein. At optional step 240, one or more arc enhancing elements or compounds may be deposited in the channel. At step 250, an alloying element is disposed in the channel. The alloying element may be formed of Chromium, for example, for providing the ultimate weld metal with a desired alloy composition. At step 260, the wire and alloying element may be mechanically compressed by a die or roll forming process. In one embodiment, the wire (with the embedded alloying element) may be fed between a pair of pinch rollers so that the alloying element is forcibly pressed into the channel and the walls of the channel are forced inward to partially or completely enclose the alloying element. At step 270, the wire, including the alloying element and any additional optional arc enhancing materials, may be drawn through a reduction die to reduce the diameter of the wire to a desired final size and to ensure concentric geometry. The resulting finished electrode may be cut to a desired length and packaged, or may be passed along for further processing.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A bimetallic welding wire, comprising:
   a welding wire having a longitudinal axis, the welding wire having an elongated channel formed on a surface thereof, the elongated channel aligned with the longitudinal axis;
   an arc enhancing material disposed in the elongated channel; and
   a metal filament disposed in the elongated channel such that the metal filament lays on top of the arc enhancing material;
   wherein the elongated channel is offset from a center of the welding wire.

2. The bimetallic welding wire of claim 1, wherein the welding wire comprises steel and the metal filament comprises copper.

3. The bimetallic welding wire of claim 1, wherein the arc enhancing material is selected from the list consisting of lithium, sodium, potassium, cesium rubidium, tungsten and carbon, including their forms in either a salt, compound molecule or elemental form.

4. The bimetallic welding wire of claim 1, a longitudinal axis of the elongated channel is oriented parallel to the longitudinal axis of the welding wire.

5. The bimetallic welding wire of claim 1, wherein the metal filament comprises an alloying element.

6. The bimetallic welding wire of claim 5, wherein the alloying element is selected from the list consisting of carbon, silicon, manganese, chromium, molybdenum, nickel and vanadium.

7. The bimetallic welding wire of claim 1, wherein a portion of the metal filament is exposed to the surface.

* * * * *